US008288879B1

(12) United States Patent
Harper

(10) Patent No.: US 8,288,879 B1
(45) Date of Patent: Oct. 16, 2012

(54) HIGHWAY GENERATOR SYSTEM

(76) Inventor: Jack R. Harper, Lake Wales, FL (US)

( * ) Notice: Subject to any disclaimer, the term of this patent is extended or adjusted under 35 U.S.C. 154(b) by 0 days.

(21) Appl. No.: 13/136,495

(22) Filed: Aug. 2, 2011

(51) Int. Cl.
F02B 63/04 (2006.01)
F03G 7/08 (2006.01)
H02K 7/18 (2006.01)
(52) U.S. Cl. ....................................................... 290/1 R
(58) Field of Classification Search .................... 290/1 R
See application file for complete search history.

(56) References Cited

U.S. PATENT DOCUMENTS

| 344,911 | A | * | 7/1886 | Kimball | 417/118 |
|---|---|---|---|---|---|
| 1,771,200 | A | * | 7/1930 | Akers | 417/229 |
| 2,020,361 | A | * | 11/1935 | Johnston | 417/214 |
| 2,333,614 | A | * | 11/1943 | Boyd | 417/229 |
| 3,895,236 | A | * | 7/1975 | Herron | 290/55 |
| 4,004,422 | A | * | 1/1977 | Le Van | 60/533 |
| 4,173,431 | A | * | 11/1979 | Smith | 417/229 |
| 4,211,078 | A | * | 7/1980 | Bass | 60/413 |
| 4,212,598 | A | * | 7/1980 | Roche et al. | 417/229 |
| 4,239,974 | A | * | 12/1980 | Swander et al. | 290/1 R |
| 4,339,920 | A | * | 7/1982 | Le Van | 60/533 |
| 4,409,489 | A | * | 10/1983 | Hayes | 290/1 R |
| 4,418,542 | A | * | 12/1983 | Ferrell | 60/668 |
| 4,434,374 | A | * | 2/1984 | Lundgren | 290/1 R |
| 4,614,875 | A | * | 9/1986 | McGee | 290/1 R |
| 4,739,179 | A | * | 4/1988 | Stites | 290/1 R |
| 4,795,449 | A | * | 1/1989 | Schneider et al. | 604/329 |
| 5,157,922 | A | * | 10/1992 | Baruch | 60/325 |
| 5,355,674 | A | * | 10/1994 | Rosenberg | 60/325 |
| 5,634,774 | A | * | 6/1997 | Angel et al. | 417/229 |
| 6,091,159 | A | * | 7/2000 | Galich | 290/1 R |
| 6,172,426 | B1 | * | 1/2001 | Galich | 290/1 R |
| 6,204,568 | B1 | * | 3/2001 | Runner | 290/1 R |
| 6,353,270 | B1 | * | 3/2002 | Sen | 290/1 R |
| 6,362,534 | B1 | * | 3/2002 | Kaufman | 290/1 R |
| 6,376,925 | B1 | * | 4/2002 | Galich | 290/1 R |
| 6,520,922 | B2 | * | 2/2003 | Michelle | 600/562 |
| 6,734,575 | B2 | * | 5/2004 | Ricketts | 290/1 R |
| 6,756,694 | B2 | * | 6/2004 | Ricketts | 290/1 R |
| 6,767,161 | B1 | * | 7/2004 | Calvo et al. | 404/71 |
| 6,858,952 | B2 | * | 2/2005 | Gott et al. | 290/1 R |
| 6,936,932 | B2 | * | 8/2005 | Kenney | 290/1 R |
| 6,949,840 | B2 | * | 9/2005 | Ricketts | 290/1 R |
| 6,969,213 | B2 | * | 11/2005 | Rastegar et al. | 404/11 |
| 7,067,932 | B1 | * | 6/2006 | Ghassemi | 290/1 R |
| 7,102,244 | B2 | * | 9/2006 | Hunter, Jr. | 290/1 R |
| 7,145,257 | B2 | * | 12/2006 | Ricketts | 290/1 R |
| 7,148,581 | B2 | * | 12/2006 | Hershey et al. | 290/1 R |
| 7,239,031 | B2 | * | 7/2007 | Ricketts | 290/1 R |
| 7,315,088 | B2 | * | 1/2008 | Erriu | 290/1 R |
| 7,371,030 | B2 | * | 5/2008 | Hickman | 404/71 |
| 7,530,761 | B2 | * | 5/2009 | Kenney | 404/71 |
| 7,541,684 | B1 | * | 6/2009 | Valentino | 290/1 R |
| 7,629,698 | B2 | * | 12/2009 | Horianopoulos et al. | 290/1 R |
| 7,641,686 | B2 | * | 1/2010 | Lashinski et al. | 623/2.1 |
| 7,714,456 | B1 | * | 5/2010 | Daya | 290/1 R |
| 8,123,431 | B2 | * | 2/2012 | Chen | 404/71 |

(Continued)

Primary Examiner — Pedro J Cuevas

(57) ABSTRACT

A primary tube with input and output ends is positioned upon a highway. A secondary tube is operatively coupled with the primary tube. An air collection tank is operatively coupled with the secondary tube and the output end of the primary tube. In this manner a closed loop path of travel is formed within and through the primary and the secondary tubes and the air collection tank. A mechanical device is located laterally spaced from the highway in operative proximity to the air collection tank. A power tube couples the mechanical device and the air collection tank. The mechanical device is a mechanical conversion device chosen from the class of mechanical conversion devices, including turbines, generators and alternators.

3 Claims, 2 Drawing Sheets

U.S. PATENT DOCUMENTS

| | | | |
|---|---|---|---|
| 2002/0133090 A1* | 9/2002 | Michelle | 600/562 |
| 2003/0132636 A1* | 7/2003 | Ricketts | 290/1 R |
| 2003/0132637 A1* | 7/2003 | Ricketts | 290/1 R |
| 2004/0130158 A1* | 7/2004 | Kenney | 290/1 R |
| 2005/0001430 A1* | 1/2005 | Ricketts | 290/1 R |
| 2006/0001267 A1* | 1/2006 | Ricketts | 290/1 R |
| 2006/0006653 A1* | 1/2006 | Ricketts | 290/1 R |
| 2007/0246282 A1* | 10/2007 | Erriu | 180/165 |
| 2008/0157537 A1* | 7/2008 | Richard | 290/1 R |
| 2008/0224477 A1* | 9/2008 | Kenney | 290/1 R |
| 2009/0043386 A1* | 2/2009 | Persson | 623/9 |
| 2009/0179433 A1* | 7/2009 | Kenney | 290/1 R |
| 2009/0315334 A1* | 12/2009 | Chen | 290/1 A |
| 2010/0101575 A1* | 4/2010 | Fedorko et al. | 128/204.21 |
| 2010/0133855 A1* | 6/2010 | Daya | 290/1 R |
| 2010/0217385 A1* | 8/2010 | Thompson et al. | 623/2.36 |

* cited by examiner

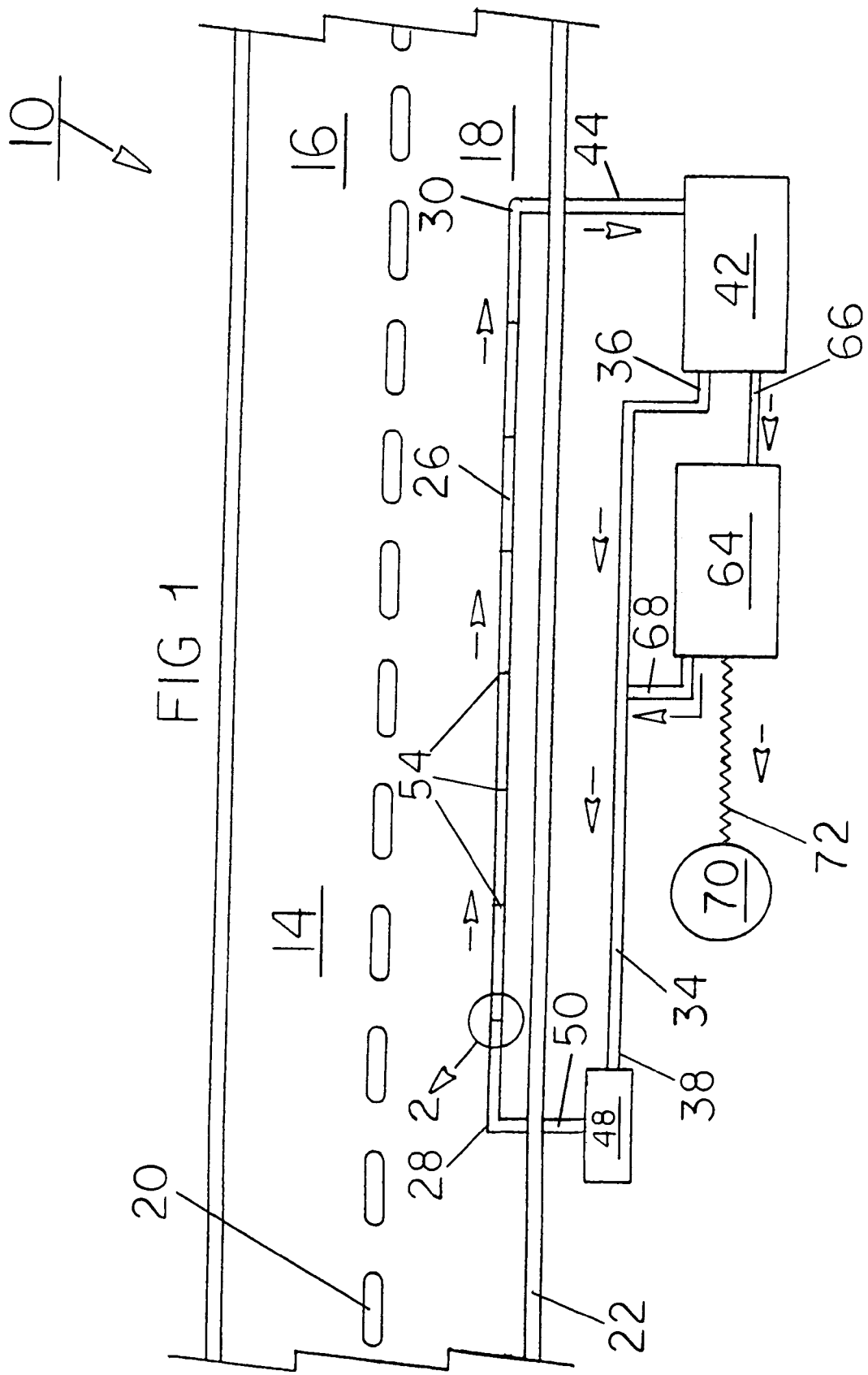

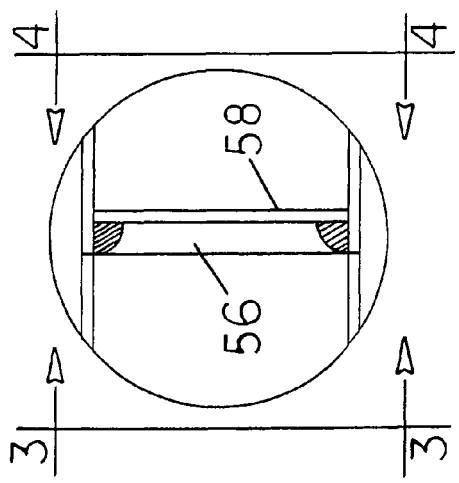
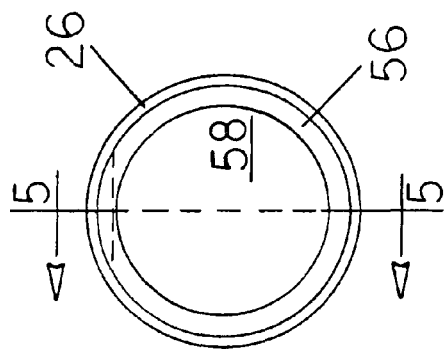
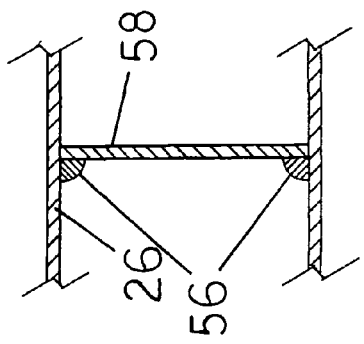
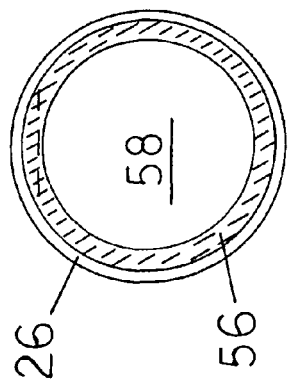

HIGHWAY GENERATOR SYSTEM

BACKGROUND OF THE INVENTION

Field of the Invention

The present invention relates to a highway generator system and more particularly pertains to creating continuous air flows in response to vehicles driving there over and converting such air flows into electrical energy, the creating and concerting being done in a safe, ecologically preferred, convenient and economical manner.

SUMMARY OF THE INVENTION

In view of the disadvantages inherent in the known types of generator systems of known designs and configurations now present in the prior art, the present invention provides an improved highway generator system. As such, the general purpose of the present invention, which will be described subsequently in greater detail, is to provide a new and improved highway generator system and method which has all the advantages of the prior art and none of the disadvantages.

To attain this, the present invention essentially comprises a highway generator system. First provided is a highway. The highway has a driving surface. The driving surface has a plurality of parallel lanes. The plurality of lanes is adapted to receive and support vehicles with wheels traveling in opposite directions. The wheeled vehicle is not shown. The lanes are separated by a centerline. The driving surface of at least one lane constitutes a monitored lane. The monitored lane has a lateral edge. The lateral edge is spaced from and essentially parallel with the centerline.

A primary tube is provided. The primary tube has an extended length. The length of the tube is positioned upon the monitored lane. The primary tube has an input end. The primary tube has an output end. The primary tube has an interior surface and an exterior surface. The primary tube is located essentially parallel with the lateral edge and the centerline. The primary tube is located closer to the lateral edge than to the centerline. In this manner the wheels of a vehicle driving along the monitored lane will drive along and contact the primary tube in a continuous manner.

A secondary tube is provided. The secondary tube has an extended length. The length of the tube is positioned adjacent to but offset from the monitored lane. The secondary tube has an input end. The input end of the secondary tube is positioned adjacent to the output end of the primary tube. The secondary tube has an output end. The output end of the secondary tube is positioned adjacent to the input end of the primary tube. The secondary tube is located essentially parallel with the lateral edge.

An air collection tank is provided. The air collection tank is operatively coupled with the input end of the secondary tube. An initial cross tube is provided. The initial cross tube connects the air collection tank with the output end of the primary tube.

A low pressure tank is provided. The low pressure tank is operatively coupled with the output end of the secondary tube. A supplemental cross tube is provided. The supplemental cross tube connects the low pressure tank with the input end of the primary tube.

A closed loop path of travel is formed. In this manner air may move within and through the primary tube, the initial cross tube, the air collection tank, the secondary tube, the low pressure tank and the supplemental cross tube. The closed loop path is adapted to convey air within the closed loop path as the wheels of a vehicle move along the primary tube.

A plurality of one-way valves is provided next. The valves are located at axially spaced locations in the primary tube. Each one-way valve includes an annular ring. The ring has a central opening. The ring has a peripheral edge. A first adhesive is provided. The first adhesive attaches the periphery to the interior surface of the primary tube. Each one-way valve also includes an imperforate circular flapper. A second adhesive is provided. The second adhesive attaches the flapper to the annular ring at an upper extent of the annular ring and the flapper. Each flapper is in facing contact with an associated ring. The flapper is provided closer to the output end of the primary tube than to the input end. In this manner a reverse flow of air is abated when no wheel is in contact with the primary tube. Also in this manner an intended flow of air is achieved when the wheel of a vehicle moves along and in driving contact with the primary tube with the flapper moving away from the ring.

Further provided is a mechanical device. The mechanical device is located laterally spaced from the highway. The mechanical device is provided in operative proximity to the air collection tank. A power tube is provided. The power tube couples the mechanical device and the air collection tank. In this manner movement of air in the tubing caused by vehicles moving along the primary tube will convert mechanical energy into electrical energy at the mechanical device. The mechanical device is a mechanical conversion device. The mechanical conversion device is chosen from the class of mechanical conversion devices. The class of mechanical conversion devices includes turbines, generators and alternators. A return tube is provided. The return tube couples the mechanical device to the secondary tube. In this manner air may circulate.

Provided last is an electrical device. The electrical device is operatively coupled to the mechanical device. An electric line is provided. The electric line couples the electric device and the mechanical device. The electrical device is an electrical utilization device. The electrical utilization device is chosen from the class of electrical utilization devices. The class of electrical utilization devices includes electrical appliances, electrical storage devices and grids.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved highway generator system which has all of the advantages of the prior art generator systems of known designs and configurations and none of the disadvantages.

It is another object of the present invention to provide a new and improved highway generator system which may be easily and efficiently manufactured and marketed.

It is further object of the present invention to provide a new and improved highway generator system which is of durable and reliable constructions.

An even further object of the present invention is to provide a new and improved highway generator system which is susceptible of a low cost of manufacture with regard to both materials and labor, and which accordingly is then susceptible of low prices of sale to the consuming public, thereby making such highway generator system economically available to the buying public.

Even still another object of the present invention is to provide a highway generator system for creating continuous air flows in response to vehicles driving there over and converting such air flows into electrical energy, the creating and concerting being done in a safe, ecologically preferred, convenient and economical manner.

Lastly, it is an object of the present invention to provide a new and improved highway generator system. A primary tube with input and output ends is positioned upon a highway. A secondary tube is operatively coupled with the primary tube. An air collection tank is operatively coupled with the secondary tube and the output end of the primary tube. In this manner a closed loop path of travel is formed within and through the primary and the secondary tubes and the air collection tank. A mechanical device is located laterally spaced from the highway in operative proximity to the air collection tank. A power tube couples the mechanical device and the air collection tank. The mechanical device is a mechanical conversion device chosen from the class of mechanical conversion devices, including turbines, generators and alternators.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of a highway generator system constructed in accordance with the principles of the present invention.

FIG. 2 is an enlarged plan view, partly in cross section, taken at Circle 2 of FIG. 1.

FIGS. 3 and 4 are cross sectional views taken along lines 3-3 and 4-4 of FIG. 2.

FIG. 5 is a cross sectional view taken along line 5-5 of FIG. 3.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved highway generator system embodying the principles and concepts of the present invention and generally designated by the reference numeral 10 will be described.

The present invention, the highway generator system 10 is comprised of a plurality of components. Such components in their broadest context include a primary tube, a secondary tube, an air collection tank and a mechanical device. Such components are individually configured and correlated with respect to each other so as to attain the desired objective.

First provided is a highway 14. The highway has a driving surface. The driving surface has a plurality of parallel lanes 16, 18. The plurality of lanes is adapted to receive and support vehicles with wheels traveling in opposite directions. The wheeled vehicle is not shown. The lanes are separated by a centerline 20. The driving surface of at least one lane constitutes a monitored lane 18. The monitored lane has a lateral edge 22. The lateral edge is spaced from and essentially parallel with the centerline.

A primary tube 26 is provided. The primary tube has an extended length. The length of the tube is positioned upon the monitored lane. The primary tube has an input end 28. The primary tube has an output end 30. The primary tube has an interior surface and an exterior surface. The primary tube is located essentially parallel with the lateral edge and the centerline. The primary tube is located closer to the lateral edge than to the centerline. In this manner the wheels of a vehicle driving along the monitored lane will drive along and contact the primary tube in a continuous manner.

A secondary tube 34 is provided. The secondary tube has an extended length. The length of the tube is positioned adjacent to but offset from the monitored lane. The secondary tube has an input end 36. The input end of the secondary tube is positioned adjacent to the output end of the primary tube. The secondary tube has an output end 38. The output end of the secondary tube is positioned adjacent to the input end of the primary tube. The secondary tube is located essentially parallel with the lateral edge.

An air collection tank 42 is provided. The air collection tank is operatively coupled with the input end of the secondary tube. An initial cross tube 44 is provided. The initial cross tube connects the air collection tank with the output end of the primary tube.

A low pressure tank 48 is provided. The low pressure tank is operatively coupled with the output end of the secondary tube. A supplemental cross tube 50 is provided. The supplemental cross tube connects the low pressure tank with the input end of the primary tube.

A closed loop path of travel is formed. In this manner air may move within and through the primary tube, the initial cross tube, the air collection tank, the secondary tube, the low pressure tank and the supplemental cross tube. The closed loop path is adapted to convey air within the closed loop path as the wheels of a vehicle move along the primary tube.

A plurality of one-way valves 54 is provided next. The valves are located at axially spaced locations in the primary tube. Each one-way valve includes an annular ring 56. The ring has a central opening. The ring has a peripheral edge. A first adhesive is provided. The first adhesive attaches the periphery to the interior surface of the primary tube. Each one-way valve also includes an imperforate circular flapper 58. A second adhesive is provided. The second adhesive attaches the flapper to the annular ring at an upper extent of the annular ring and the flapper. Each flapper is in facing contact with an associated ring. The flapper is provided closer to the output end of the primary tube than to the input end. In this manner a reverse flow of air is abated when no wheel is in contact with the primary tube. Also in this manner an intended flow of air is achieved when the wheel of a vehicle moves along and in driving contact with the primary tube with the flapper moving away from the ring.

Further provided is a mechanical device 64. The mechanical device is located laterally spaced from the highway. The mechanical device is provided in operative proximity to the air collection tank. A power tube 66 is provided. The power tube couples the mechanical device and the air collection tank. In this manner movement of air in the tubing caused by vehicles moving along the primary tube will convert mechanical energy into electrical energy at the mechanical device. The mechanical device is a mechanical conversion device. The mechanical conversion device is chosen from the class of mechanical conversion devices. The class of mechanical conversion devices includes turbines, generators and alternators. A return tube 68 is provided. The return tube couples the mechanical device to the secondary tube. In this manner air may circulate.

Provided last is an electrical device 70. The electrical device is operatively coupled to the mechanical device. An electric line 72 is provided. The electric line couples the electric device and the mechanical device. The electrical device is an electrical utilization device. The electrical utilization device is chosen from the class of electrical utilization devices. The class of electrical utilization devices includes electrical appliances, electrical storage devices and grids.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, all suitable modifications and equivalents may be resorted to, falling within the scope of the invention.

What is claimed as being new and desired to be protected by Letters Patent of the United States is as follows:

1. A driving surface generator system comprising:
    a primary tube with input and output ends positioned upon a driving surface;
    a secondary tube having input and output ends operatively coupled with the primary tube;
    an air collection tank operatively coupled with the input end of the secondary tube and the output end of the primary tube, an initial cross tube coupling the output end of the primary tube and the input end of the secondary tube, a supplemental cross tube coupling the input end of the primary tube and the output end of the secondary tube thereby forming a closed loop path of travel within and through the primary and the secondary tubes and the air collection tank;
    a mechanical device located laterally spaced from the driving surface in operative proximity to the air collection tank, power tube coupling the mechanical device and the air collection tank, means for transferring mechanical power produced by the mechanical device into electrical power, the mechanical device being a mechanical conversion device chosen from the class of mechanical conversion devices including turbo-generators and turbo-alternators; and
    a plurality of axially aligned one-way valves located at spaced locations in the primary tube, each one-way valve including an annular ring having a central opening and a peripheral edge, a first adhesive attaching the periphery to the interior surface of the primary tube, each one-way valve also including an imperforate circular flapper, a second adhesive attaching the flapper to the annular ring at an upper extent of the annular ring and the flapper, each flapper being in facing contact with an associated ring closer to the output end of the primary tube than to the input end whereby a reverse flow of air is abated.

2. The system as set forth in claim 1 and further including:
    an electrical device operatively coupled to the mechanical device, an electric line coupling the electric device and the mechanical device, the electrical device being an electrical utilization device chosen from the class of electrical utilization devices including electrical appliances, electrical storage devices and grids.

3. A highway generator system (10) for creating continuous air flows in response to vehicles driving there over and converting such air flows into electrical energy, the creating and converting being done in a safe, ecologically preferred, convenient and economical manner, the system comprising, in combination:
    a highway (14) having a driving surface formed into a plurality of parallel lanes (16), (18), the plurality of lanes adapted to receive and support vehicles with wheels traveling in opposite directions, the lanes being separated by a centerline (20), the driving surface of at least one lane constituting a monitored lane (18), the monitored lane having a lateral edge (22) spaced from and essentially parallel with the centerline;
    a primary tube (26) of an extended length positioned upon the monitored lane, the primary tube having an input end (28) and an output end (30), the primary tube having an interior surface and an exterior surface, the primary tube being located essentially parallel with the lateral edge and the centerline, the primary tube being located closer to the lateral edge than to the centerline whereby the wheels of a vehicle driving along the monitored lane will drive along and contact the primary tube in a continuous manner;
    a secondary tube (34) of an extended length positioned adjacent to but offset from the monitored lane, the secondary tube having an input end (36) adjacent to the output end of the primary tube, the secondary tube having an output end (38) adjacent to the input end of the primary tube, the secondary tube being located essentially parallel with the lateral edge;
    an air collection tank (42) operatively coupled with the input end of the secondary tube, an initial cross tube (44) connecting the air collection tank with the output end of the primary tube;
    a low pressure tank (48) operatively coupled with the output end of the secondary tube, a supplemental cross tube (50) connecting the low pressure tank with the input end of the primary tube;
    a closed loop path of travel thus being formed for air movement within and through the primary tube and the initial cross tube and the air collection tank and the secondary tube and the low pressure tank and the supplemental cross tube, the closed loop path adapted to convey air within the closed loop path as the wheels of a vehicle move along the primary tube;

a plurality of one-way valves (54) located at axially aligned, spaced locations in the primary tube, each one-way valve including an annular ring (56) having a central opening and a peripheral edge, a first adhesive attaching the periphery to the interior surface of the primary tube, each one-way valve also including an imperforate circular flapper (58), a second adhesive attaching the flapper to the annular ring at an upper extent of the annular ring and the flapper, each flapper being in facing contact with an associated ring closer to the output end of the primary tube than to the input end whereby a reverse flow of air is abated when no wheel is in contact with the primary tube and whereby an intended flow of air is achieved when the wheel of a vehicle moves along and in driving contact with the primary tube with the flapper moving away from the ring;

a mechanical device (64) located laterally spaced from the highway in operative proximity to the air collection tank, power tube (66) coupling the mechanical device and the air collection tank whereby movement of air in the tubing caused by vehicles moving along the primary tube will convert mechanical energy into electrical energy at the mechanical device, the mechanical device being a mechanical conversion device chosen from the class of mechanical conversion devices chosen from the class of mechanical conversion devices including turbo-alternators and turbo-generators, a return tube (68) coupling the mechanical device to the secondary tube for the circulation of air; and an electrical device (70) operatively coupled to the mechanical device, an electric line (72) coupling the electric device and the mechanical device, means for transferring mechanical power produced by the mechanical device into electrical power, the electrical device being an electrical utilization device chosen from the class of electrical utilization devices including electrical appliances, electrical storage devices and grids.

* * * * *